United States Patent
Sheridan et al.

(10) Patent No.: US 9,569,498 B2
(45) Date of Patent: Feb. 14, 2017

(54) USING IMAGE FEATURES TO EXTRACT VIEWPORTS FROM IMAGES

(71) Applicant: Google Inc., Mountain View, CA (US)

(72) Inventors: Alan Sheridan, San Jose, CA (US); Scott Benjamin Satkin, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 294 days.

(21) Appl. No.: 14/317,639

(22) Filed: Jun. 27, 2014

(65) Prior Publication Data
US 2015/0379086 A1 Dec. 31, 2015

(51) Int. Cl.
*G06F 17/30* (2006.01)
*G06K 9/32* (2006.01)

(52) U.S. Cl.
CPC ....... *G06F 17/30522* (2013.01); *G06K 9/3233* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,841,439 A | * | 11/1998 | Pose | G06T 15/005 345/418 |
| 8,683,519 B2 | * | 3/2014 | McCarthy | H04N 5/44591 725/41 |
| 8,898,150 B1 | * | 11/2014 | Kuramochi | G06F 17/30265 707/722 |
| 2009/0213112 A1 | | 8/2009 | Zhu et al. | |
| 2013/0035853 A1 | * | 2/2013 | Stout | G06T 17/05 701/438 |
| 2013/0100132 A1 | * | 4/2013 | Katayama | H04N 13/0022 345/420 |
| 2013/0148882 A1 | | 6/2013 | Lee | |

OTHER PUBLICATIONS

Lampert C H et al: "Efficient Subwindow search: A Branch and Bound Framework for Object Localization"?IEEE Transactions on Pattern Analysis and Machine Intelligence? IEEE Computer Society? USA? vol. 31? No. 12? Dec. 1, 2009 (Dec. 1, 2009)?pp. 2129-2142? XP01127058.
Partial International Search Report for Application No. PCT/US2015/037152 dated Jun. 23, 2015.

(Continued)

*Primary Examiner* — Shyue Jiunn Hwa
(74) *Attorney, Agent, or Firm* — Lerner, David, Littenberg, Krumholz & Mentlik, LLP (57) ABSTRACT

Aspects of the disclosure provide for selecting viewports. A viewport is a sub-portion of an image. For example, a request to select a viewport for a particular image may be received. A set of potential viewports are identified within the particular image, and features are identified within the viewports of the set of potential viewports. A score is calculated for each given viewport of the set of potential viewports based at least in part on a weight vector having a set of feature weights and the identified features within that given viewport of the set of potential viewports. A viewport of the set of potential viewports is selected based on the calculated scores. The selected viewport is then provided in response to the request to select the viewport for the particular image.

20 Claims, 7 Drawing Sheets

(56) References Cited

OTHER PUBLICATIONS

Pack, Jeremy, "Finding the Best Panoramas", Fall 2011, pp. 1-5, <http://cs229.stanford.edu/proj2011/jeremyPack.pdf>.
Cheng, Ming-Ming, "Salient Object Detection and Segmentation", 2011, pp. 1-9, <http://mmcheng.net/salobj/>.
Yu et al., "Automatic Interesting Object Extraction From Images Using Complementary Saliency Maps", 2010, 4 pages, <http://www.jdl.ac.cn/doc/2010/mm2010_Automatic%20interesting%20object%20extraction%20from%20images%20using%20complementary%20saliency%20maps.pdf>.
Berg et al., "Automatic Ranking of Iconic Images", 2007, Electrical Engineering and Computer Sciences University of California at Berkeley, 13 pages, <http://www.eecs.berkeley.edu/Pubs/TechRpts/2007/EECS-2007-13.pdf>.
Dalal et al., "Histograms of Oriented Gradients for Human Detection", 2005, 8 pages, <http://lear.inrialpes.fr/people/triggs/pubs/Dalal-cvpr05.pdf>.
Oliva et al., "Building the gist of a scene: the role of global image features in recognition", Progress in Brain Research, vol. 155, 2006, 14 pages, <http://cvcl.mit.edu/Papers/OlivaTorralbaPBR2006.pdf>.

* cited by examiner

USING IMAGE FEATURES TO EXTRACT VIEWPORTS FROM IMAGES

BACKGROUND

Various systems provide users with images of different locations. Some systems provide users with panoramic images or panoramic images having a generally wider field of view. For example, panoramic images may include an image or collection of images having a field of view which is greater than that of the human eye, e.g., 180 degrees or greater. Some panoramic images may provide a 360-degree view of a location.

SUMMARY

Aspects of the disclosure provide a computer-implemented method for selecting viewports where a viewport is a sub-portion of an image. The method includes receiving, by one or more computing devices, a request for a particular image; identifying, by the one or more computing devices, a set of potential viewports within the particular image; identifying, by the one or more computing devices, features within the viewports of the set of potential viewports; calculating, by the one or more computing devices, a score for each given viewport of the set of potential viewports based at least in part on a weight vector having a set of feature weights and the identified features within that given viewport of the set of potential viewports; selecting, by the one or more computing devices, a viewport of the set of potential viewports based on the calculated scores; and providing, by the one or more computing devices, the selected viewport and the particular image in response to the request.

In one example, the method also includes receiving a set of training panoramic images. At least one of the training panoramic images of the set is associated with information identifying a most interesting viewport in that panoramic image. In that regard, the method also includes, before calculating the score for each viewport, using the set of training panoramic images as training data to tune the feature weights of the weight vector. In addition or alternatively, the method also includes identifying a potential viewport of the at least one panoramic image that overlaps with at least a portion of the most interesting viewport, and the potential viewport of the at least one panoramic image that overlaps with at least the portion of the most interesting viewport is further used as training data to tune the feature weights of the weight vector. In this example, the method includes identifying a potential viewport of the at least one panoramic image that completely overlaps with the most interesting viewport, and the potential viewport of the at least one panoramic image that completely overlaps with the most interesting viewport is further used as training data to tune the feature weights of the weight vector. In addition or alternatively, the method also includes identifying a second set of potential viewports for the each panoramic image of the set of panoramic images. Here, each given potential viewport the second set of potential viewports are each associated with information identifying the given potential viewport as not a most interesting viewport for a corresponding panoramic image of the given potential viewport. The method also includes processing each viewport of the second set of potential viewports in order to identify features, and the features identified in each viewport of the second set of potential viewports are further used as training data to tune the feature weights of the weight vector.

In another example, the request includes information identifying an aspect ratio of the viewport and identifying the set of potential viewports is further based on the aspect ratio. In another example, the request for the viewport is part of a request for search results, and the method also includes selecting a viewport of a second panoramic image based on the weight vector and providing the selected viewport of the second panoramic image with the selected viewport and a set of search results.

Another aspect of the disclosure provides a system for selecting viewports where a viewport is a sub-portion of an image. The system includes one or more computing devices configured to receive a request for a particular image; identify a set of potential viewports within the particular image; identify features within the viewports of the set of potential viewports; calculate a score for each given viewport of the set of potential viewports based at least in part on a weight vector having a set of feature weights and the identified features within that given viewport of the set of potential viewports; select a viewport of the set of potential viewports based on the calculated scores; and provide the selected viewport and the particular image in response to the request.

In one example, the one or more computing devices are also configured to receive a set of training panoramic images. At least one of the training panoramic images of the set is associated with information identifying a most interesting viewport in that panoramic image. In that regard, the one or more computing devices are configured to, before calculating the score for each viewport, use the set of training panoramic images as training data to tune the feature weights of the weight vector. In this example, the one or more computing devices are further configured to identify a potential viewport of the at least one panoramic image that overlaps with at least a portion of the most interesting viewport, and the potential viewport of the at least one panoramic image that overlaps with at least the portion of the most interesting viewport is further used as training data to tune the feature weights of the weight vector. In addition or alternatively, the one or more computing devices are further configured to identify a potential viewport of the at least one panoramic image that completely overlaps with the most interesting viewport, and the potential viewport of the at least one panoramic image that completely overlaps with the most interesting viewport is further used as training data to tune the feature weights of the weight vector. In addition or alternatively, the one or more computing devices are further configured to identify a second set of potential viewports for the each panoramic image of the set of panoramic images. Here, each given potential viewport the second set of potential viewports are each associated with information identifying the given potential viewport as not a most interesting viewport for a corresponding panoramic image of the given potential viewport. The one or more computing devices are also configured to process each viewport of the second set of potential viewports in order to identify features, and the features identified in each viewport of the second set of potential viewports are further used as training data to tune the feature weights of the weight vector.

In another example, the request for includes information identifying an aspect ratio of the viewport and identifying the set of potential viewports is further based on the aspect ratio. In another example, the request for the viewport is part of a request for search results, and the one or more computing devices are also configured to select a viewport of a second panoramic image based on the weight vector and provide the selected viewport of the second panoramic image with the selected viewport and a set of search results.

A further aspect of the disclosure provides a non-transitory computer-readable storage medium on which computer readable instructions of a program are stored. The instructions, when executed by a processor, cause the processor to perform a method for selecting viewports, where a viewport is a sub-portion of an image. The method includes receiving a request for a particular image; identifying a set of potential viewports within the particular image; identifying features within the viewports of the set of potential viewports; calculating a score for each given viewport of the set of potential viewports based at least in part on a weight vector having a set of feature weights and the identified features within that given viewport of the set of potential viewports; selecting a viewport of the set of potential viewports based on the calculated scores; and providing the selected viewport and the particular image in response to the request.

In one example, the method also includes receiving a set of training panoramic images. At least one of the training panoramic images of the set is associated with information identifying a most interesting viewport in that panoramic image. In that regard, the method also includes, before calculating the score for each viewport, using the set of training panoramic images as training data to tune the feature weights of the weight vector. In addition or alternatively, the method also includes identifying a potential viewport of the at least one panoramic image that overlaps with at least a portion of the most interesting viewport, and the potential viewport of the at least one panoramic image that overlaps with at least the portion of the most interesting viewport is further used as training data to tune the feature weights of the weight vector. In this example, the method includes identifying a potential viewport of the at least one panoramic image that completely overlaps with the most interesting viewport, and the potential viewport of the at least one panoramic image that completely overlaps with the most interesting viewport is further used as training data to tune the feature weights of the weight vector. In addition or alternatively, the method also includes identifying a second set of potential viewports for the each panoramic image of the set of panoramic images. Here, each given potential viewport the second set of potential viewports are each associated with information identifying the given potential viewport as not a most interesting viewport for a corresponding panoramic image of the given potential viewport. The method also includes processing each viewport of the second set of potential viewports in order to identify features, and the features identified in each viewport of the second set of potential viewports are further used as training data to tune the feature weights of the weight vector.

In another example, the request includes information identifying an aspect ratio of the viewport and identifying the set of potential viewports is further based on the aspect ratio. In another example, the request for the viewport is part of a request for search results, and the method also includes selecting a viewport of a second panoramic image based on the weight vector and providing the selected viewport of the second panoramic image with the selected viewport and a set of search results.

DETAILED DESCRIPTION

Overview

The technology relates to automatically identifying and serving salient sub portions of images, such as panoramic images, that are most likely to be interesting or appealing to users. As an example, a system may select panoramic images to be served to a user of a computing device. However, because of the difficulty in displaying an entire panoramic image all at once without distortion, the system may select a sub portion of the panoramic image that will be displayed on the client computing device. As noted above, a sub portion of an image (e.g., an area of the image corresponding to less than all of the pixels of an image) or a "viewport" may be selected because it is likely to have a high saliency as compared to other sub portions of the same image. To the user, the system may appear to automatically crop images to their most interesting regions.

In order to select a sub portion, a model may be trained using a set of training data. This training data may include a set of panoramic images, where at least some of the panoramic images are associated with information identifying a viewport of the panoramic image that was considered to be the most interesting by an operator. As an example, an operator may be a person who captured the panoramic image or simply someone who was reviewing the image. In this regard, a person may select a view port, for example, by identifying a rectangle or other shape which the person believes includes the most interesting details of the panoramic image. In some examples, the shape may have a particular aspect ratio (e.g., m pixels by n pixels), though various other sizes may be used. In some examples, the training data may also include viewports that an operator has identified as least interesting, although such input may not be required.

The training data may be processed in order to separate the panoramas into a number of possible viewports including those that are identified as interesting and those that are not. For example, given specific dimensions for a viewport, a sliding window may be used to identify each possible viewport. In some cases, this may include viewports that were identified as least interesting. The viewports that are not identified as interesting may all be of the same size, (e.g., m pixels by n pixels). In this regard, at least some of the possible viewports may completely or partially overlap with those viewports that are identified as interesting.

The training data may then be used as input for machine learning to output a weight vector. For example, computer vision processing techniques may be used to extract features from the possible viewports. Examples features may include colors, shapes, objects, textures, viewport size and location, combinations of features, etc. The weight vector may include a series of weights for each of the features extracted from the possible viewports. The weights identify how interesting that particular type of feature is. In this regard, the training data may be used to tune the weight vector.

The weight vector may then be used to identify interesting portions of images given a particular aspect ratio. Again, a sliding window may be used to identify possible viewports. Each possible viewport may then be processed to identify features and generate a feature vector. The weight vector may then be used to score the feature vector. The viewport having the feature vector with the highest score may be identified as the most interesting viewport. A similar calculation may be used to determine the most interesting viewport having a particular aspect ratio as between any number of images. In some cases, this calculation may be augmented using non-maximum suppression.

Thus, the weight vector may be used to determine not only what images to serve to users but also what portions of those images to display to the user. For instance, the features described above may be used to determine how to display a given image as part of a set of search results, as part of a set of thumbnails of interesting images related to a map displayed on a user's mobile device (e.g., a tablet or phone) or in a web browser, etc.

While the features described above are explained in relation to panoramic images, the same techniques may be used to identify salient portions of non-panoramic images. In that regard, the training data may also include non-panoramic images associated with information identifying a most interesting viewport as well as non-panoramic images that are not associated with such information.

As noted above, the weight vector allows for a determination of the most interesting viewport in any given image. The system need not actually identify any particular objects in the image or generate a saliency map for each image in order to do so.

Example Systems

Figure 1:
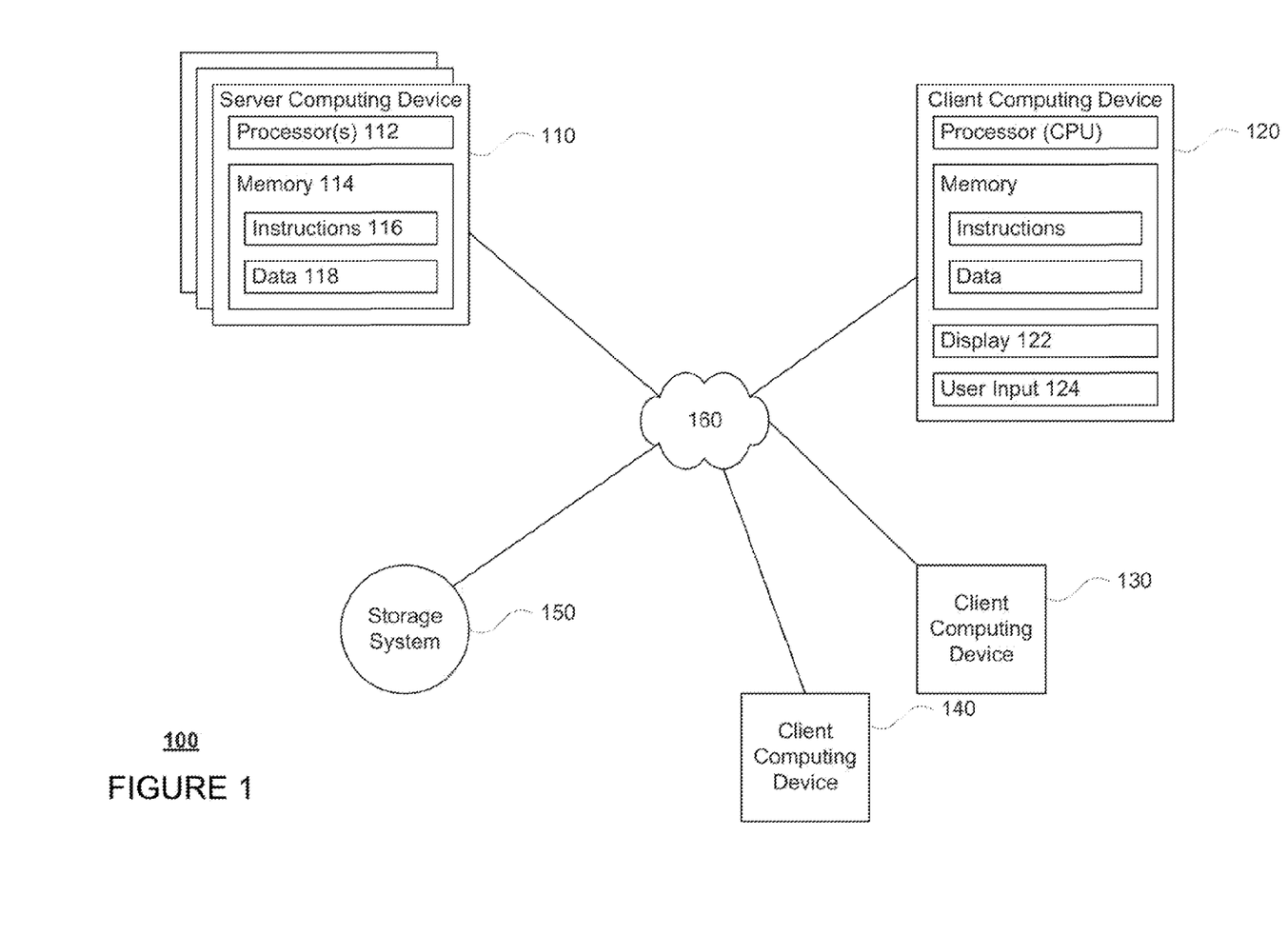
FIG. 1 is a functional diagram of an example system in accordance with aspects of the disclosure.
Figure 2:
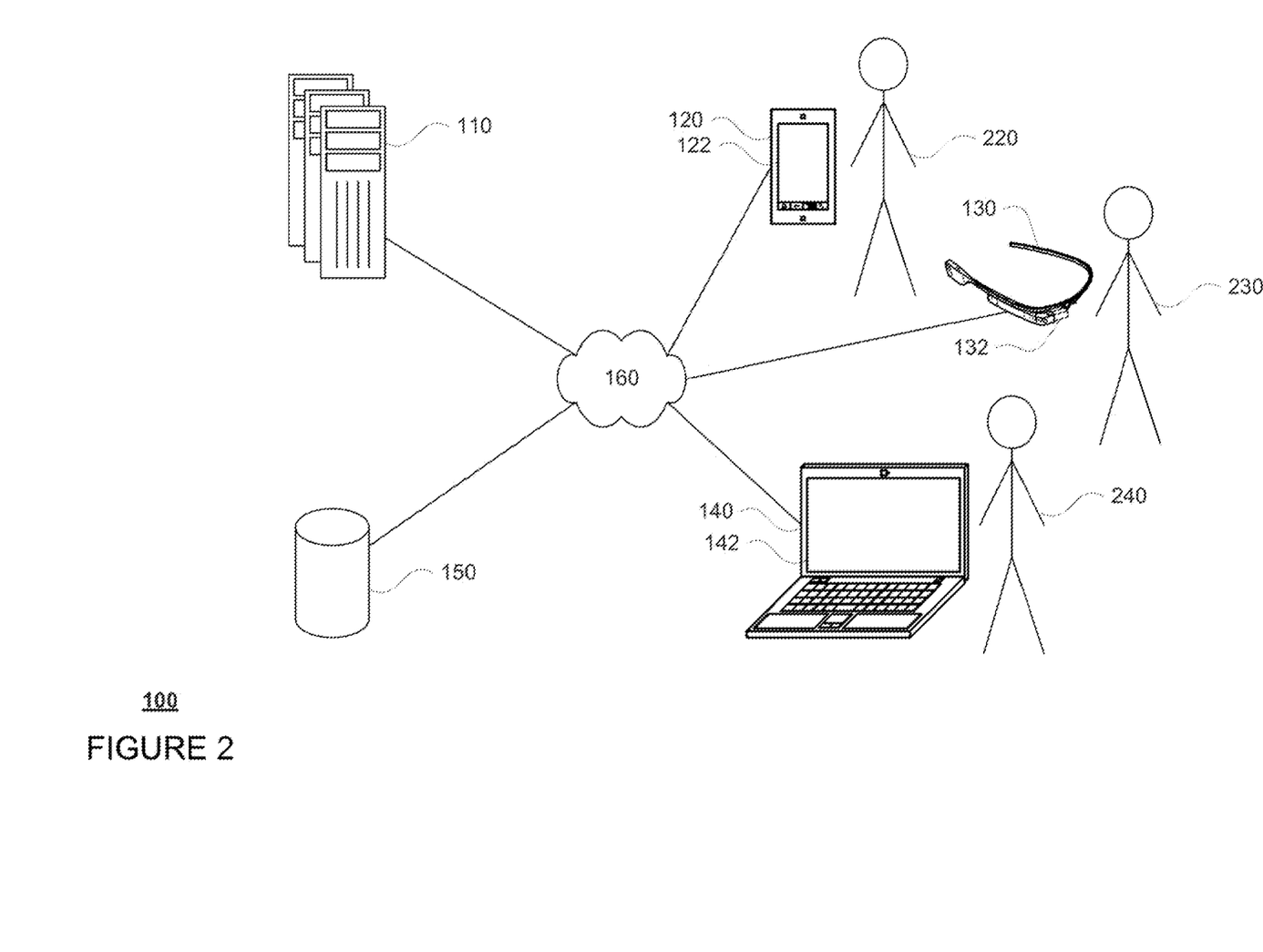
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Computing device 110 can contain one or more processors 112, memory 114 and other components typically present in general purpose computing devices. Memory 114 of computing device 110 can store information accessible by processor 112, including instructions 116 that can be executed by the processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of the network 160 and capable of directly and indirectly communicating with other nodes of the network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store images. at least some of these images may include panoramic images, such as those described above having a field of view which is greater than that of the human eye, e.g., 180 degrees or greater. In addition to images, storage system 150 may also store information associated with those images such as viewports or sub portions of those images selected as being salient as described in further detail below. The viewport information may be stored such that it can be used to identify a particular subset of pixels of an image and to display just that subset of pixels.

In addition to images, storage system 150 may also store a model as well as training data that can be used to update or generate the model. In some examples, the model may include a weight vector, and the training data may include a set of images as well as sub portions or viewports of those images that have been identified as being salient or interesting as described in more detail below. While the features described herein are explained in relation to panoramic images, the same techniques may be used to identify salient portions of non-panoramic images. In that regard, the training data may also include non-panoramic images associated with information identifying salient viewports as well as non-panoramic images that are not associated with such information.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices that may be physically located at the same or different geographic locations. Storage system 150 may be connected to the computing devices via the network 160 as shown in FIG. 1 and/or may be directly connected to or incorporated into any of the computing devices 110-140 (not shown).

Example Methods

As noted above, in order to select viewports, the model may be trained using the set of training data of storage system 150. As noted above, this training data may include a set of images such as the panoramic images shown in FIG. 3. Example training data 300 includes two panoramic images 302 and 322. These panoramic images may have been captured at different locations at different dates and times.

Figure 3:
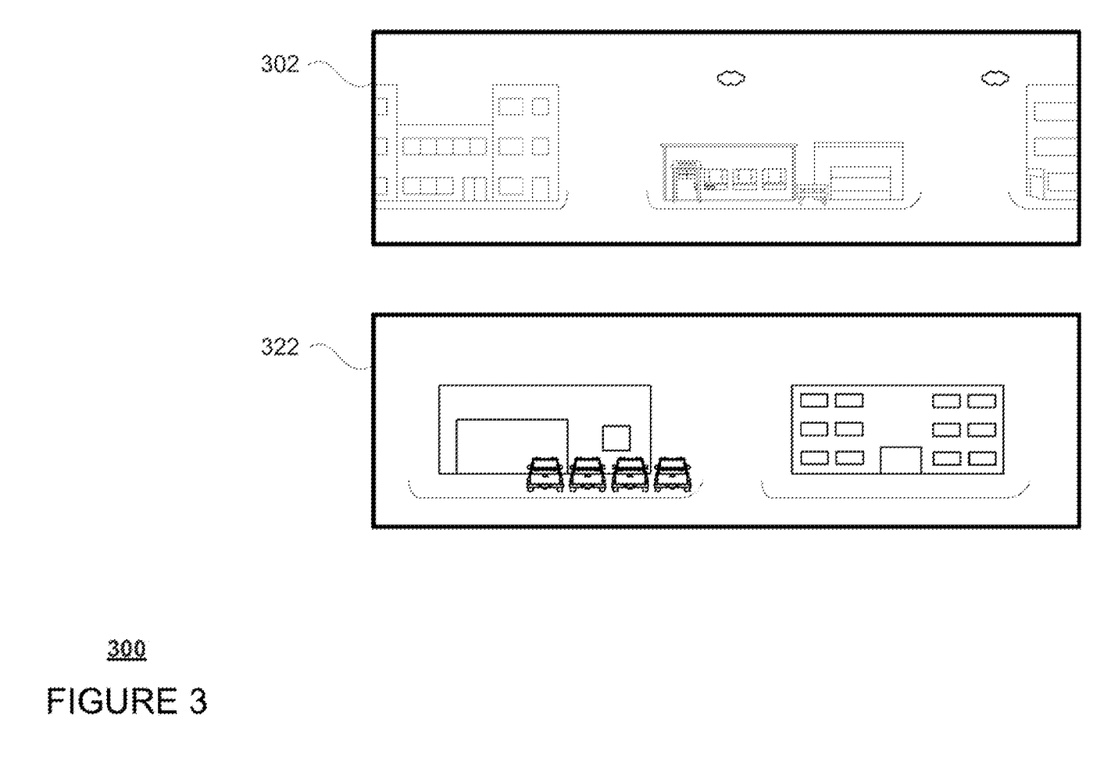
FIG. 3 is an example of a set of training data in accordance with aspects of the disclosure.

At least some of the set of training data may be associated with information identifying a viewport, or sub portion of the image, that was considered to be interesting. The idea of what is interesting is a personal one, and may be determined, at least initially, by a human operator manually reviewing the images and selecting a sub portion of the image. As an example, an operator may be a person who captured the panoramic image or simply someone who viewed the image. In this regard, a person may select a viewport, for example, by identifying a rectangle or other shape which the person believes includes the most interesting details of the panoramic image. This may be achieved using an application or other computing tool to select or draw the viewport and send this information to the one or more server computing devices 110 to store in the storage system 150 as part of the set training data. In some examples, the shape may have a particular dimensions or aspect ratio (e.g., m pixels by n pixels), though various other sizes may be used.

Figure 4:
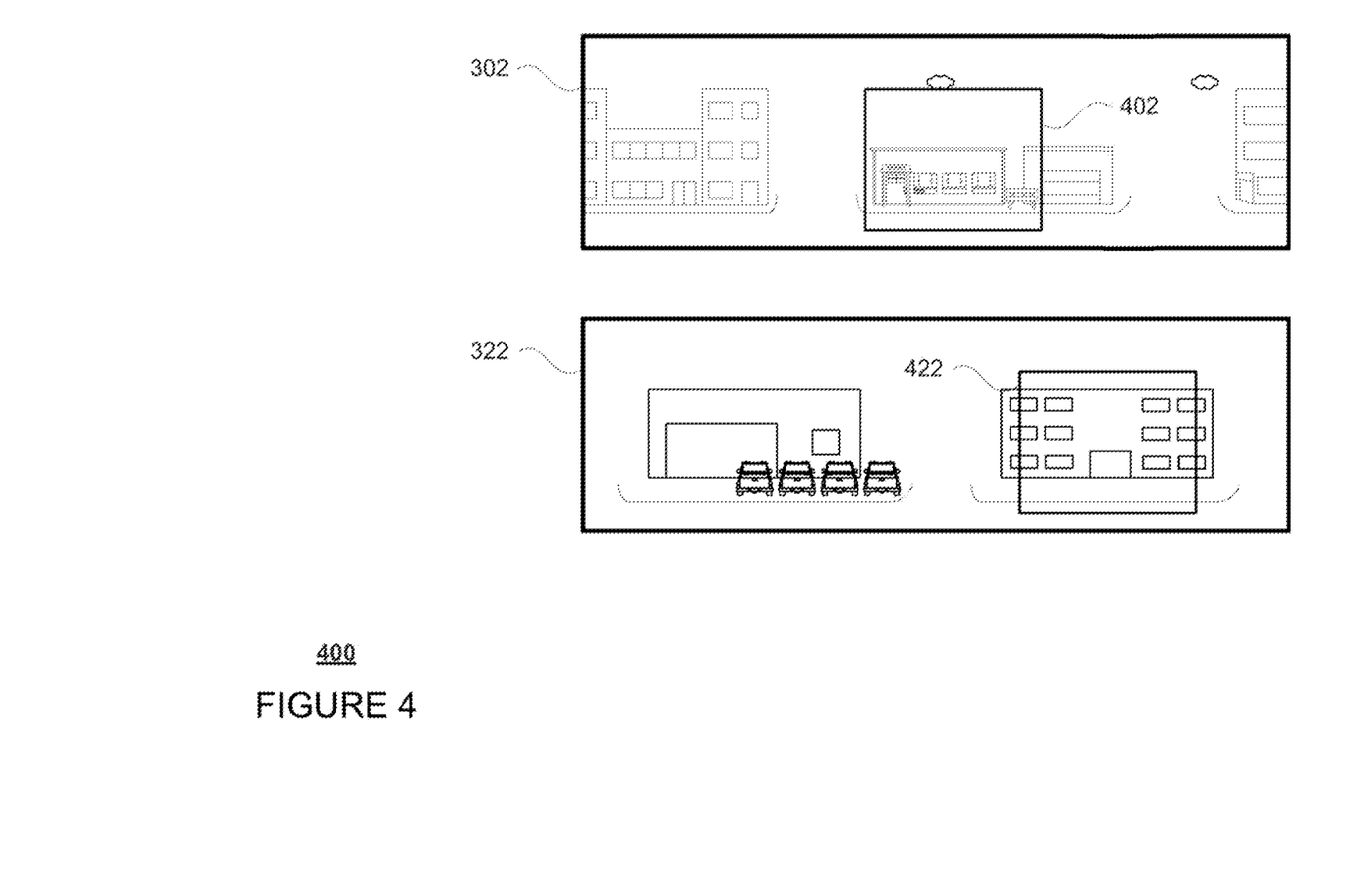
FIG. 4 is an example of a set of training data and associated salient viewports in accordance with aspects of the disclosure.

FIG. 4 is an example 400 of the training data 300 which includes salient viewport 402 associated with panoramic image 302 and salient viewport 422 associated with panoramic image 322. Each salient viewport may be associated with a label identifying the viewport as salient. As noted above, these salient viewports may have been identified by an operator. In this example, both viewports 402 and 422 are approximately the same size (e.g., shape and number of pixels). However, as noted above, various other shapes and sizes may also be used. In that regard, the dimensions or aspect ratios of viewports 402 and 422 may actually be different.

In some examples, the training data may also include viewports that an operator has identified as least interesting although such input may not be required. For example, viewport 422 may have been identified as the least interesting or salient viewport in the panoramic image 322 to an operator, while viewport 402 may have been selected as the most salient viewport in the panoramic image 302 to an operator. Again, the viewports may be of a particular size and shape, such that for a given image, the most salient viewport of a first size may be different (fully, partially, or not overlapping at all) from the most salient viewport of a second size which is different from the first size.

Figure 5:
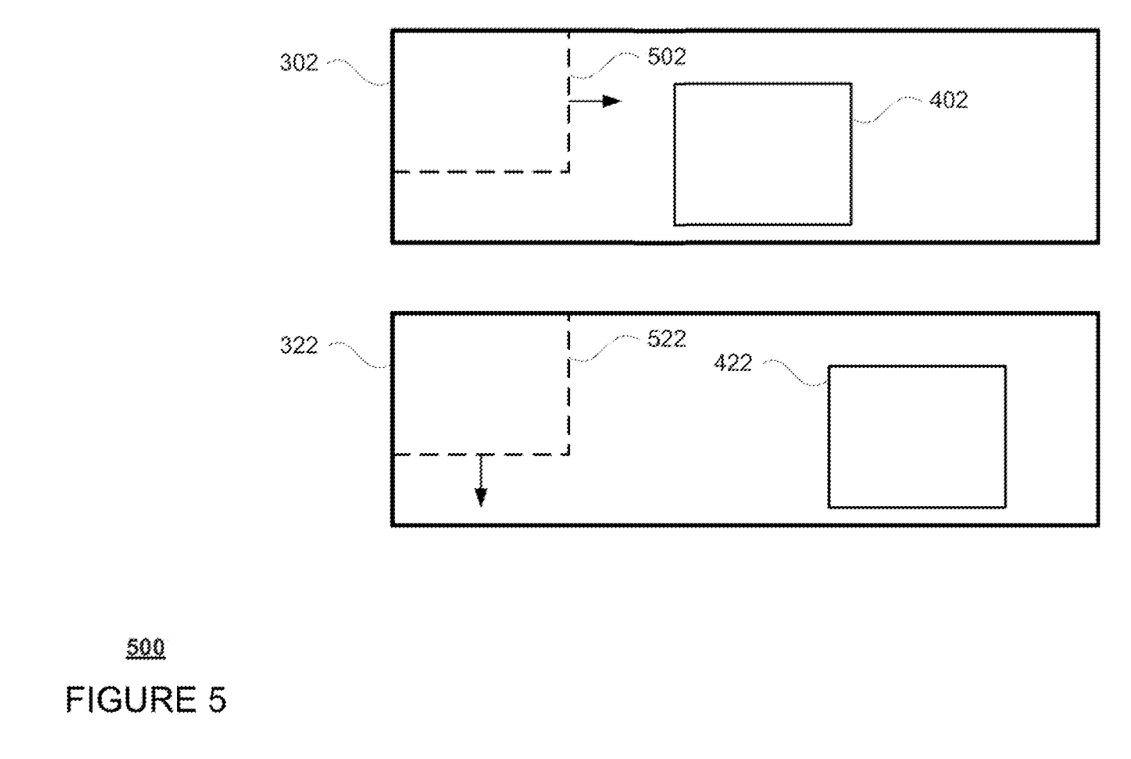
FIG. 5 is an example of a set of training data and a sliding window in accordance with aspects of the disclosure.

The training data may be processed in order to separate the panoramas into a number of possible viewports. For example, a sliding window having fixed dimension (such as m by n pixels) may be used to identify each possible viewport as shown in example 500 of FIG. 5. For example, sliding windows 502 and 522 may be moved around panoramic images 302 and 322 in order to identify a set of possible view ports for each image. These possible viewports may be overlapping or not overlapping, depending on the number and size of possible viewports in the set.

Figure 6:
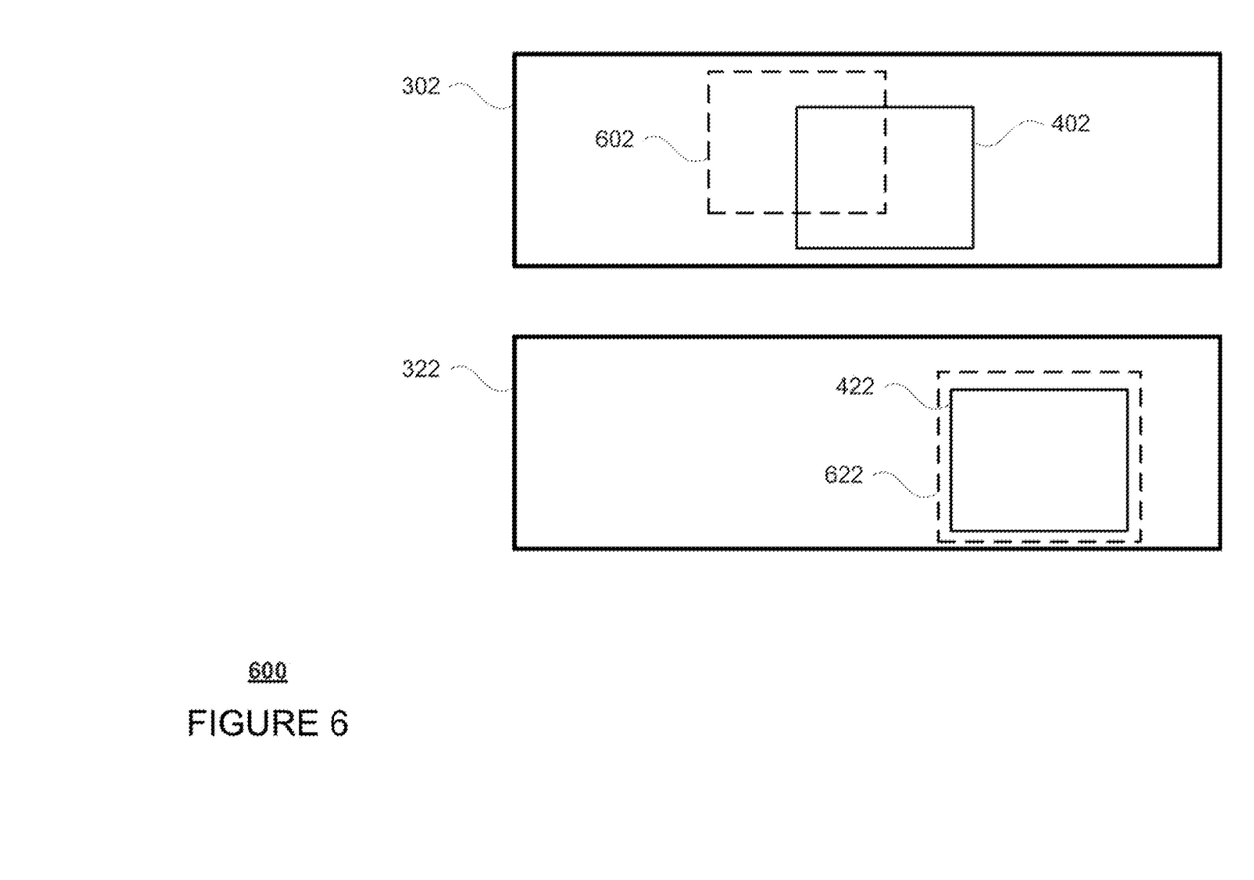
FIG. 6 is an example of possible viewports that partially and completely overlap with salient viewports.

As shown in example 600 of FIG. 6, the possible viewports may partially or completely overlap with the viewports identified by operators as salient. For example, possible viewport 602 only partially overlaps with the salient viewport 402. Possible viewport 622 completely overlaps with salient viewport 422. However, because possible viewport 622 is larger in size than salient viewport 422, possible viewport 622 may include additional features of panoramic image 322. In this regard, the dimensions of the possible viewports may be the same or different from the dimensions of any salient viewports. These possible viewports may then be identified with a label indicating that the possible viewports are non-salient. In addition, if the dimensions of the possible and salient viewports are the same, in some cases, the possible viewport and salient viewport may be identical, or rather overlap perfectly. In such an example, the possible viewport may be associated with a label indicating that the possible viewport is a salient viewport. Similar examples may also be used for non-salient viewports.

The training data, including the images, possible viewports, salient viewports, and labels may then be used as input for machine learning to output a weight vector. For example, computer vision processing techniques, such as those that employ histograms of various features or global descriptors, may be used to extract features from the possible viewports. Examples features may include colors, shapes, objects, textures, viewport size and location, combinations of features, etc.

As noted above, the weight vector may include a series of weights for each of the features extracted from the possible viewports. In this regard, the weight vector may be a vector of real-valued numbers, for example: $\vec{W}$=[0, 0.789, −1.42, 0, 0, 0.207, −0.389]. The dimensionality of the vector, or the total number of values of the vector, may correspond to the number of features being considered.

The weights may identify how salient or interesting a particular type of feature is, in other words, the higher the weight, the more interesting. Thus, features that are included in viewports with a salient label may be more likely to have a greater weight in the weight vector. Accordingly, the training data is used to tune the weight vector. Because machine learning is used, the weight vector may be tuned over time, such that as new images, potential viewport, salient viewports, and labels are added to the training data, the weight vector may be further tuned based on the updated training data.

The weight vector may then be used to identify a salient viewport in any image. As with the training data, individual images of storage system 150 may be processed to identify a set of possible viewports. Again, a sliding window of m by n pixels may be used to identify possible viewports of the set. Each possible viewport may then be processed, for example, using the computer vision processing described above in order to identify features. These features may be combined into a feature vector listing values representing which features were identified in a particular possible viewport, for example, $\vec{F}$=[0.89, −0.34, 0, 1.28, 0, −1.89, 0.25]. This feature vector may contain the actual distribution of features in the viewport. The weights of the weight vector may then be used to calculate a score for the feature vectors for each of the possible viewports of the set, for example by determining a dot product between the feature and the weight vectors. In some cases, this calculation may be augmented using non-maximum suppression. The viewport having the feature vector with the highest score, or the highest value dot product between the feature vector for that viewport and the weight vector ($\vec{W} \cdot \vec{F}$), may be identified as the most salient viewport.

A similar calculation may be used to determine the most interesting viewport having different dimensions or rather for different aspect ratios. In that regard, there may be a default aspect ratio for certain types of images, for example, based on whether the image is a panoramic image (e.g., the field of view) or the number of pixels in the image. When a user (or a requesting client computing device) requests a salient viewport having specific dimensions or a specific aspect ratio different from the default value, the dimensions of the viewports of the set of possible viewports may be selected correspond to those specific dimensions. Again, the most salient viewport for a given image may be entirely different for different viewport dimensions.

Once the most salient viewport for a given image has been identified as described above, the most salient viewport mat be associated with the given image, and that association stored in memory, such as the storage system 150. In this regard, in response to a request received by one or more server computing devices 110 from a client computing device to retrieve an image, for example, for display to a user on the client computing device, the most salient viewport associated with the requested image as well as the image may be provided to the client computing device. Once received, the client computing device may display the most salient viewport to the user such that the user views only that viewport or the sub-portion of the image corresponding to the most salient viewport. This may be especially useful where the image is a panoramic image or an image with a wide field of view, for instance greater than 90 degrees. As an example, the most salient viewport may be used to display a set of image search results, such that one or more images of the search results are displayed using an associated most salient viewport. As another example, when a set of images are related to a map displayed on a client computing device, the most salient viewport may be used to display those images.

Alternatively, rather than identifying the most salient viewport and storing the information in memory for retrieval in response to a request for an image, the most salient viewport may be identified in real time. In this regard, in response to a request for one or more images, such as an image search request from a client computing device, the one or more server computing devices may identify one or more responsive images, and then process those images to identify the most salient viewport. Thus, the one or more relevant images may then be sent to the requesting client computing devices along with information identifying any most salient viewports of those one or more images for display at the client computing device.

Figure 7:
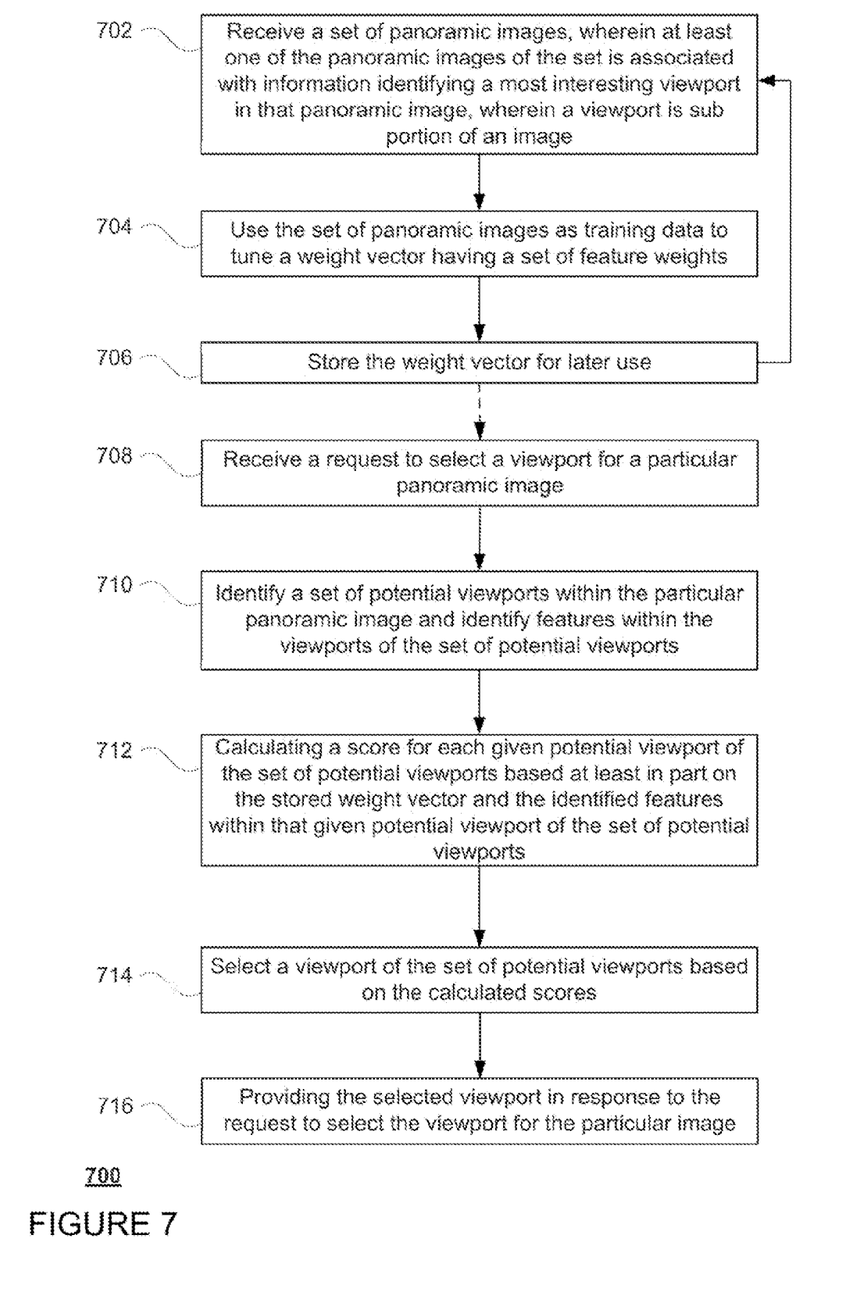
FIG. 7 is a flow diagram in accordance with aspects of the disclosure.

Flow diagram 700 of FIG. 7 is an example of some of the aspects described above which may be performed by one or more processors of a client computing device and/or one or more server computing devices as noted above. For example, at block 702, a set of panoramic images is received. At least one of the panoramic images of the set is associated with information identifying a most interesting viewport in that panoramic image. The set of panoramic images are used as training data to tune a weight vector having a set of feature weights at block 704. This weight vector is then stored for later use at block 706. These steps may repeat themselves as additional panoramic images are added to the set.

At block 708, a request to select a viewport for a particular panoramic image is received. A set of potential viewports is identified within the particular panoramic image, and features are identified within the viewports of the set of potential viewports at block 710. A score is then calculated for each given viewport of the set of potential viewports based at least in part on the stored weight vector and the identified features within that given viewport of the set of potential viewports at block 712. Again the stored weight vector has a set of feature weights that are used as part of the calculation. A viewport is selected from the set of potential viewports based on the calculated scores at block 714. For example, this selected viewport may have the highest calculated score of the set of potential viewports. The selected viewport is then provided in response to the request to select the viewport for the particular image at block 716.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method for selecting salient viewports, the method comprising:
    receiving, by one or more computing devices, a request for a particular image;
    identifying, by the one or more computing devices, a set of two or more potential viewports within the particular image, wherein each potential viewport of the set of two or more potential viewports is a sub-portion of the particular image;
    identifying, by the one or more computing devices, features within each potential viewport of the set of two or more potential viewports, the features being visual features;
    generating, by the one or more computing devices, a weight vector having a set of feature weights, each feature weight representing a weight of at least one feature;
    generating, by the one or more computing devices, for each given potential viewport of the set of two or more potential viewports, a feature vector having a set of values, each value of the set of values representing at least one feature, the feature vector for the given potential viewport indicating identified features within the given potential viewport;
    calculating, by the one or more computing devices, a score for each given potential viewport of the set of two or more potential viewports based at least in part on the weight vector and the feature vector for that given potential viewport of the set of two or more potential viewports;
    selecting, by the one or more computing devices, a viewport of the set of two or more potential viewports as a most salient viewport based on the calculated scores; and
    providing, by the one or more computing devices, the selected viewport such that only a sub-portion of the particular image corresponding to the most salient viewport is displayed to a user in response to the request.

2. The method of claim 1, further comprising:
    receiving a set of training panoramic images, wherein at least one of the training panoramic images of the set of training panoramic images is associated with information identifying a most salient viewport in the at least one training panoramic image; and
    before calculating the score for each viewport, using the set of training panoramic images as training data to tune the feature weights of the weight vector.

3. The method of claim 2, further comprising:
    identifying a potential viewport of the at least one training panoramic image that overlaps with at least a portion of the most salient viewport in the at least one training panoramic image, and
    wherein the potential viewport of the at least one training panoramic image that overlaps with at least the portion of the most salient viewport in the at least one training panoramic image is further used as training data to tune the feature weights of the weight vector.

4. The method of claim 2, further comprising:
    identifying a potential viewport of the at least one training panoramic image that completely overlaps with the most salient viewport in the at least one training panoramic image, and
    wherein the potential viewport of the at least one training panoramic image that completely overlaps with the most salient viewport in the at least one training panoramic image is further used as training data to tune the feature weights of the weight vector.

5. The method of claim 2, further comprising:
    identifying a second set of two or more potential viewports for each training panoramic image of the set of training panoramic images, wherein each given potential viewport the second set of two or more potential viewports are each associated with information identifying the given potential viewport as not a most salient viewport for a corresponding panoramic image of the given potential viewport; and
    processing each potential viewport of the second set of two or more potential viewports in order to identify features, and
    wherein the features identified in each potential viewport of the second set of two or more potential viewports are further used as training data to tune the feature weights of the weight vector.

6. The method of claim 1, wherein:
    the request includes information identifying an aspect ratio of the viewport; and
    identifying the set of two or more potential viewports is further based on the aspect ratio.

7. The method of claim 1, wherein the request for the viewport is part of a request for search results, and the method further comprises:
    selecting a viewport of a second panoramic image based on the weight vector; and
    providing the selected viewport of the second panoramic image with the selected viewport and a set of search results.

8. A system for selecting viewports, the system comprising:
one or more computing devices configured to:
receive a request for a particular image;
identify a set of two or more potential viewports within the particular image, wherein each potential viewport of the set of two or more potential viewports is a sub-portion of the particular image;
identify features within each potential viewport of the set of two or more potential viewports, the features being visual features;
generate a weight vector having a set of feature weights, each feature weight representing a weight of at least one feature;
generate, for each given potential viewport of the set of two or more potential viewports, a feature vector having a set of values, each value of the set of values representing at least one feature, the feature vector for the given potential viewport indicating identified features within the given potential viewport;
calculate a score for each given potential viewport of the set of two or more potential viewports based at least in part on the weight vector and the feature vector for that given potential viewport of the set of two or more potential viewports;
select a viewport of the set of two or more potential viewports as a most salient viewport based on the calculated scores; and
provide the selected viewport such that only a sub-portion of the particular image corresponding to the most salient viewport is displayed to a user in response to the request.

9. The system of claim 8, wherein the one or more computing devices are further configured to:
receive a set of training panoramic images, wherein at least one of the training panoramic images of the set of training panoramic images is associated with information identifying a most salient viewport in the at least one training panoramic image; and
before calculating the score for each viewport, use the set of training panoramic images as training data to tune the feature weights of the weight vector.

10. The system of claim 9, wherein the one or more computing devices are further configured to:
identify a potential viewport of the at least one training panoramic image that overlaps with at least a portion of the most salient viewport in the at least one training panoramic image, and
wherein the potential viewport of the at least one training panoramic image that overlaps with at least the portion of the most salient viewport in the at least one training panoramic image is further used as training data to tune the feature weights of the weight vector.

11. The system of claim 9, wherein the one or more computing devices are further configured to:
identify a potential viewport of the at least one training panoramic image that completely overlaps with the most salient viewport in the at least one training panoramic image, and
wherein the potential viewport of the at least one training panoramic image that completely overlaps with the most salient viewport in the at least one training panoramic image is further used as training data to tune the feature weights of the weight vector.

12. The system of claim 9, wherein the one or more computing devices are further configured to:
identify a second set of two or more potential viewports for each training panoramic image of the set of training panoramic images, wherein each given potential viewport the second set of two or more potential viewports are each associated with information identifying the given potential viewport as not a most salient viewport for a corresponding panoramic image of the given potential viewport; and
process each potential viewport of the second set of two or more potential viewports in order to identify features, and
wherein the features identified in each potential viewport of the second set of two or more potential viewports are further used as training data to tune the feature weights of the weight vector.

13. The system of claim 8, wherein:
the request for includes information identifying an aspect ratio of the viewport; and
identifying the set of two or more potential viewports is further based on the aspect ratio.

14. The system of claim 8, wherein the request for the viewport is part of a request for search results, and the one or more computing devices are further configured to:
select a viewport of a second panoramic image based on the weight vector; and
provide the selected viewport of the second panoramic image with the selected viewport and a set of search results.

15. A non-transitory computer-readable storage medium on which computer readable instructions of a program are stored, the instructions, when executed by a processor, cause the processor to perform a method for selecting viewports, the method comprising:
receiving a request for a particular image;
identifying, by the one or more computing devices, a set of two or more potential viewports within the particular image, wherein each potential viewport of the set of two or more potential viewports is a sub-portion of the particular image;
identifying features within each potential viewport of the set of two or more potential viewports, the features being visual features;
generating a weight vector having a set of feature weights, each feature weight representing a weight of at least one feature;
generating for each given potential viewport of the set of two or more potential viewports, a feature vector having a set of values, each value of the set of values representing at least one feature, the feature vector for the given potential viewport indicating identified features within the given potential viewport;
calculating a score for each given potential viewport of the set of two or more potential viewports based at least in part on the weight vector and the feature vector for that given potential viewport of the set of two or more potential viewports;
selecting a viewport of the set of two or more potential viewports as a most salient viewport based on the calculated scores; and
providing the selected viewport such that only a sub-portion of the particular image corresponding to the most salient viewport is displayed to a user in response to the request.

16. The medium of claim 15, wherein the method further comprises:
receiving a set of training panoramic images, wherein at least one of the training panoramic images of the set of training panoramic images is associated with information identifying a most salient viewport in the at least one training panoramic image; and before calculating the score for each viewport, using the set of training panoramic images as training data to tune the feature weights of the weight vector.

17. The medium of claim 15, wherein the method further comprises:

identifying a potential viewport of the at least one training panoramic image that overlaps with at least a portion of the most salient viewport in the at least one training panoramic image, and wherein the potential viewport of the at least one training panoramic image that overlaps with at least the portion of the most salient viewport in the at least one training panoramic image is further used as training data to tune the feature weights of the weight vector.

18. The medium of claim 15, wherein the method further comprises:

identifying a second set of two or more potential viewports for each training panoramic image of the set of training panoramic images, wherein each given potential viewport the second set of two or more potential viewports are each associated with information identifying the given potential viewport as not a most salient viewport for a corresponding panoramic image of the given potential viewport; and processing each potential viewport of the second set of two or more potential viewports in order to identify features, and wherein the features identified in each potential viewport of the second set of two or more potential viewports are further used as training data to tune the feature weights of the weight vector.

19. The medium of claim 15, wherein:

the request for the viewport includes information identifying an aspect ratio of the viewport; and identifying the set of two or more potential viewports is further based on the aspect ratio.

20. The medium of claim 15, wherein the request for the viewport is part of a request for search results, and the method further comprises:

selecting a viewport of a second panoramic image based on the weight vector; and providing the selected viewport of the second panoramic image with the selected viewport and a set of search results.

\* \* \* \* \*